US011046369B2

(12) United States Patent
Natsume et al.

(10) Patent No.: US 11,046,369 B2
(45) Date of Patent: Jun. 29, 2021

(54) LOWER VEHICLE-BODY STRUCTURE

(71) Applicant: MAZDA MOTOR CORPORATION, Hiroshima (JP)

(72) Inventors: Hirotaka Natsume, Hiroshima (JP); Kazuhiro Kageyama, Hiroshima (JP); Keisuke Ebisumoto, Hiroshima (JP); Hidenori Matsuoka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 140 days.

(21) Appl. No.: 16/435,767

(22) Filed: Jun. 10, 2019

(65) Prior Publication Data
US 2019/0382052 A1    Dec. 19, 2019

(30) Foreign Application Priority Data

Jun. 15, 2018 (JP) .............................. JP2018-114725

(51) Int. Cl.
*B62D 25/20*    (2006.01)
*B62D 25/02*    (2006.01)
(Continued)

(52) U.S. Cl.
CPC ......... *B62D 25/2036* (2013.01); *B60N 2/015* (2013.01); *B62D 25/025* (2013.01); *B62D 27/02* (2013.01)

(58) Field of Classification Search
CPC .. B62D 25/025; B62D 25/20; B62D 25/2036; B62D 27/02; B60N 2/015
(Continued)

(56) References Cited

U.S. PATENT DOCUMENTS 6,007,145 A * 12/1999 Tezuka .................. B62D 25/20
                                                  296/203.01
7,270,369 B2 * 9/2007 Okana .................... B62D 21/10
                                                  296/187.03
(Continued)

FOREIGN PATENT DOCUMENTS

DE    102011051622 A1    1/2013
DE    102012015938 A1    2/2013
(Continued)

OTHER PUBLICATIONS

The extended European search report issued by the European Patent Office dated Nov. 7, 2019, which corresponds to European Patent Application No. 19178995.7-1013 and is related to U.S. Appl. No. 16/435,767.

*Primary Examiner* — Gregory A Blankenship
(74) *Attorney, Agent, or Firm* — Studebaker & Brackett PC

(57) ABSTRACT

A lower vehicle-body structure of the present invention comprises a vehicle floor, a first floor cross member extending in a vehicle width direction, a second floor cross member extending in the vehicle width direction, the second floor cross member being spaced, in a vehicle longitudinal direction, apart from the first floor cross member, a side sill extending in the vehicle longitudinal direction and provided at an end portion, in the vehicle width direction, of the vehicle floor, a floor frame extending in the vehicle longitudinal direction and provided on an inward side, in the vehicle width direction, of the side sill, and attaching members for attaching a seat to a vehicle body. The attaching members are fixed to the side sill, the first floor cross member, and/or the second floor cross member.

20 Claims, 14 Drawing Sheets

(51) Int. Cl.
B62D 27/02 (2006.01)
B60N 2/015 (2006.01)

(58) Field of Classification Search
USPC .............................. 296/193.07, 187.08, 204
See application file for complete search history.

(56) References Cited

U.S. PATENT DOCUMENTS

| | | | | |
|---|---|---|---|---|
| 2005/0194818 | A1* | 9/2005 | Odaka | B62D 21/157 296/187.12 |
| 2007/0126264 | A1* | 6/2007 | Mizuma | B60N 2/015 296/204 |
| 2008/0007089 | A1* | 1/2008 | Bachmann | B62D 21/157 296/187.08 |
| 2009/0066118 | A1* | 3/2009 | Tosaka | B60N 2/005 296/204 |
| 2010/0156146 | A1* | 6/2010 | Matsuyama | B62D 25/2036 296/193.07 |
| 2010/0237659 | A1* | 9/2010 | Ishigame | B60N 2/005 296/204 |
| 2012/0256448 | A1* | 10/2012 | Yasui | B62D 25/2036 296/209 |
| 2013/0009424 | A1 | 1/2013 | Herntier | |
| 2013/0049405 | A1* | 2/2013 | Kurogi | B62D 25/06 296/203.01 |
| 2013/0049408 | A1* | 2/2013 | Kurogi | B62D 25/025 296/209 |
| 2013/0076077 | A1* | 3/2013 | Hirooka | B62D 21/00 296/204 |
| 2013/0341969 | A1* | 12/2013 | Fujii | B62D 25/08 296/193.07 |
| 2014/0306485 | A1* | 10/2014 | Bechtler | B62D 29/008 296/187.08 |
| 2014/0327268 | A1* | 11/2014 | Mori | B62D 25/2036 296/187.08 |
| 2015/0008703 | A1* | 1/2015 | Furusaki | B62D 25/2036 296/187.08 |
| 2015/0042128 | A1* | 2/2015 | Kowaki | B62D 25/20 296/193.07 |
| 2016/0159402 | A1 | 6/2016 | Nakaya et al. | |
| 2016/0311471 | A1* | 10/2016 | Iyoshi | B62D 25/025 |
| 2017/0015360 | A1* | 1/2017 | Onishi | B62D 21/157 |
| 2017/0297628 | A1* | 10/2017 | Iyoshi | B62D 25/04 |
| 2017/0361875 | A1* | 12/2017 | Ayuzawa | B62D 25/025 |
| 2018/0022389 | A1* | 1/2018 | Kageyama | B62D 21/157 296/187.08 |
| 2018/0186411 | A1* | 7/2018 | Ast | B62D 29/005 |
| 2019/0009832 | A1* | 1/2019 | Kageyama | B60N 2/015 |
| 2019/0202286 | A1* | 7/2019 | Natsume | B62D 25/20 |
| 2019/0217742 | A1* | 7/2019 | Natsume | B60K 17/08 |
| 2019/0217891 | A1* | 7/2019 | Natsume | B62D 25/025 |
| 2019/0329827 | A1* | 10/2019 | Soma | B60R 13/0876 |
| 2019/0382052 | A1* | 12/2019 | Natsume | B62D 25/20 |
| 2019/0382053 | A1* | 12/2019 | Natsume | B62D 27/02 |
| 2019/0382054 | A1* | 12/2019 | Natsume | B62D 25/025 |
| 2020/0031399 | A1* | 1/2020 | Matsuda | B62D 21/03 |
| 2020/0047818 | A1* | 2/2020 | Ebisumoto | B62D 25/20 |
| 2020/0114978 | A1* | 4/2020 | Liu | B62D 21/02 |
| 2020/0282816 | A1* | 9/2020 | Matsuda | B62D 25/20 |
| 2020/0361535 | A1* | 11/2020 | Matsuda | B62D 21/09 |
| 2020/0361542 | A1* | 11/2020 | Matsuda | B62D 25/20 |

FOREIGN PATENT DOCUMENTS

| | | |
|---|---|---|
| DE | 202015008168 U1 | 4/2016 |
| JP | 2010-228482 A | 10/2010 |
| WO | 2018055855 A1 | 3/2018 |

\* cited by examiner

LOWER VEHICLE-BODY STRUCTURE

BACKGROUND OF THE INVENTION

The present invention relates to a lower vehicle-body structure.

A floor cross member extending in a vehicle with direction and a floor flame extending in a vehicle longitudinal direction are provided on an upper face of a vehicle floor of an automotive vehicle for improving the vehicle-body rigidity or the like. Further, a seat rail to guide a slide move of a seat is generally provided on the vehicle floor such that it extends in the vehicle longitudinal direction. In general, this seat rail is fixed to a vehicle body via brackets having the high rigidity. Thereby, the heavy seat can be stably supported.

In order to secure the attachment rigidity of the seat rail, as disclosed in Japanese Patent Laid-Open Publication No. 2010-228482, the seat rail is fixed so that the weight of the seat rail can be received by the floor cross member and the floor frame which are provided on the vehicle floor.

However, in a structure disclosed in the above-described patent document, there is still room for improvement on the support rigidity of the vehicle body for properly supporting the seat rail from a viewpoint of a sense of unity between the vehicle body and the seat.

SUMMARY OF THE INVENTION

Accordingly, an object of the present invention is to provide a lower vehicle-body structure which can properly improve the support rigidity of the vehicle floor for supporting the seat rail.

The present invention is a lower vehicle-body structure which comprise a vehicle floor comprising a bottom face portion and a top face portion, a first floor cross member extending in a vehicle width direction and provided on the top face portion of the vehicle floor, the first floor cross member forming a closed cross section between the top face portion of the vehicle floor and the first floor cross member in a cross section perpendicular to the vehicle width direction, a second floor cross member extending in the vehicle width direction and provided on the top face portion of the vehicle floor, the second floor cross member forming a closed cross section between the top face portion of the vehicle floor and the second floor cross member in a cross section perpendicular to the vehicle width direction, the second floor cross member being spaced, in a vehicle longitudinal direction, apart from the first floor cross member, a side sill extending in the vehicle longitudinal direction and provided at an end portion, in the vehicle width direction, of the top face portion of the vehicle floor, the side sill forming a closed cross section between the top face portion of the vehicle floor and the side sill in a cross section perpendicular to the vehicle longitudinal direction, a floor frame extending in the vehicle longitudinal direction and provided on the bottom face portion of the vehicle floor at a position which is located on an inward side, in the vehicle width direction, of the side sill, the floor frame forming a closed cross section between the bottom face portion of the vehicle floor and the floor frame in a cross section perpendicular to the vehicle longitudinal direction, and an attaching member attaching a seat to a vehicle body, wherein the first floor cross member, the second floor cross member, the side sill, and the floor frame are located at respective positions which overlap each other at least partially in a vehicle vertical direction, and the attaching member is fixed to the side sill, the first floor cross member, and/or the second floor cross member.

According to the present invention, a frame structure is formed at the vehicle floor by means of the side sill and the floor frame which respectively extend in the vehicle longitudinal direction and having the closed cross section and the first floor cross member and the second floor cross member which respectively extend in the vehicle width direction and having the closed cross section. Further, the members of this frame structure are configured not to be offset in the vehicle vertical direction. Accordingly, the support rigidity of the vehicle floor for attaching the seat can be properly improved, and also a sense of unity between the vehicle body and the seat can be improved by fixing the attaching member for attaching the seat to the frame structure.

In an embodiment of the present invention, the side sill includes a reinforcing plate which extends along a plane crossing the vehicle longitudinal direction inside the closed cross section of the side sill, and the reinforcing plate is located at a position which overlaps at least one of the first floor cross member and the second floor cross member in the vehicle longitudinal direction.

According to this embodiment, since the reinforcing plate extending along the plane crossing the vehicle longitudinal direction is provided at the side sill, the strength, in the vehicle vertical direction and in the vehicle width direction, of the side sill can be improved. Moreover, since the reinforcing plate is located at the position overlapping at least one of the first floor cross member and the second floor cross member in the vehicle longitudinal direction, the rigidity of the frame structure formed by means of the side sill, the floor frame, the first floor cross member, and the second floor cross member can be improved.

In another embodiment of the present invention, the reinforcing plate is located at a position which overlap the first floor cross member in the vehicle longitudinal direction, and the reinforcing member is located at a position which is offset, toward the second floor cross member, from a center, in the vehicle longitudinal direction, of the first floor cross member.

According to this embodiment, a load applied from the seat can be effectively transmitted to the first floor cross member by way of the reinforcing member because the seat is generally arranged between the first floor cross member and the second floor cross member in the vehicle longitudinal direction.

In another embodiment of the present invention, the reinforcing plate is located at a position which overlap the second floor cross member in the vehicle longitudinal direction, and the reinforcing member is located at a position which is offset, toward the first floor cross member, from a center, in the vehicle longitudinal direction, of the second floor cross member.

According to this embodiment, a load applied from the seat can be effectively transmitted to the second floor cross member by way of the reinforcing member because the seat is generally arranged between the first floor cross member and the second floor cross member in the vehicle longitudinal direction.

In another embodiment of the present invention, the attaching member is fixed to the side sill and any one of the first floor cross member and the second floor cross member.

According to this embodiment, since the attaching member is fixed to a corner portion which is formed by the side sill and any one of the first floor cross member and the second floor cross member, the support rigidity of the vehicle floor for attaching the seat can be properly improved.

In another embodiment of the present invention, the vehicle floor comprises a floor tunnel which is configured to protrude upwardly from the top face portion and extend in the vehicle longitudinal direction and an upper step portion which is configured to rise upwardly toward the floor tunnel from the top face portion in the vehicle width direction, and the attaching member is attached to the upper step portion and any one of the first floor cross member and the second floor cross member.

According to this embodiment, a ladder-shaped structure is formed at the vehicle floor by means of the side sill, the upper step portion, and the floor frame which respectively extend in the vehicle longitudinal direction and the first floor cross member and the second floor cross member which respectively extend in the vehicle width direction. Since the attaching member is fixed to a corner portion which is formed by the upper step portion and any one of the first floor cross member and the second floor cross member, the support rigidity of the vehicle floor for attaching the seat can be properly improved.

Moreover, since the upper step portion configured to rise upwardly is provided between the vehicle floor and the floor tunnel, the rigidity of a boundary area between the vehicle floor and the floor tunnel can be improved. Since the attaching member is fixed to the upper step portion, the support rigidity of the vehicle floor for attaching the seat can be properly improved.

In another embodiment of the present invention, the lower vehicle-body structure further comprises a spacer which is interposed between the attaching member and the upper step portion and interconnects the attaching member and the upper step portion.

According to this embodiment, since the spacer is provided between the attaching member for attaching the seat and the upper step portion, the strength of the attaching member against compression which is generated in the vehicle vertical direction by the load applied from the seat can be improved.

Other features, aspects, and advantages of the present invention will become apparent from the following description which refers to the accompanying drawings.

DETAILED DESCRIPTION OF THE INVENTION

Hereafter, an embodiment of the present invention will be described referring to the attached drawings.

[Whole Structure]

Figure 1:
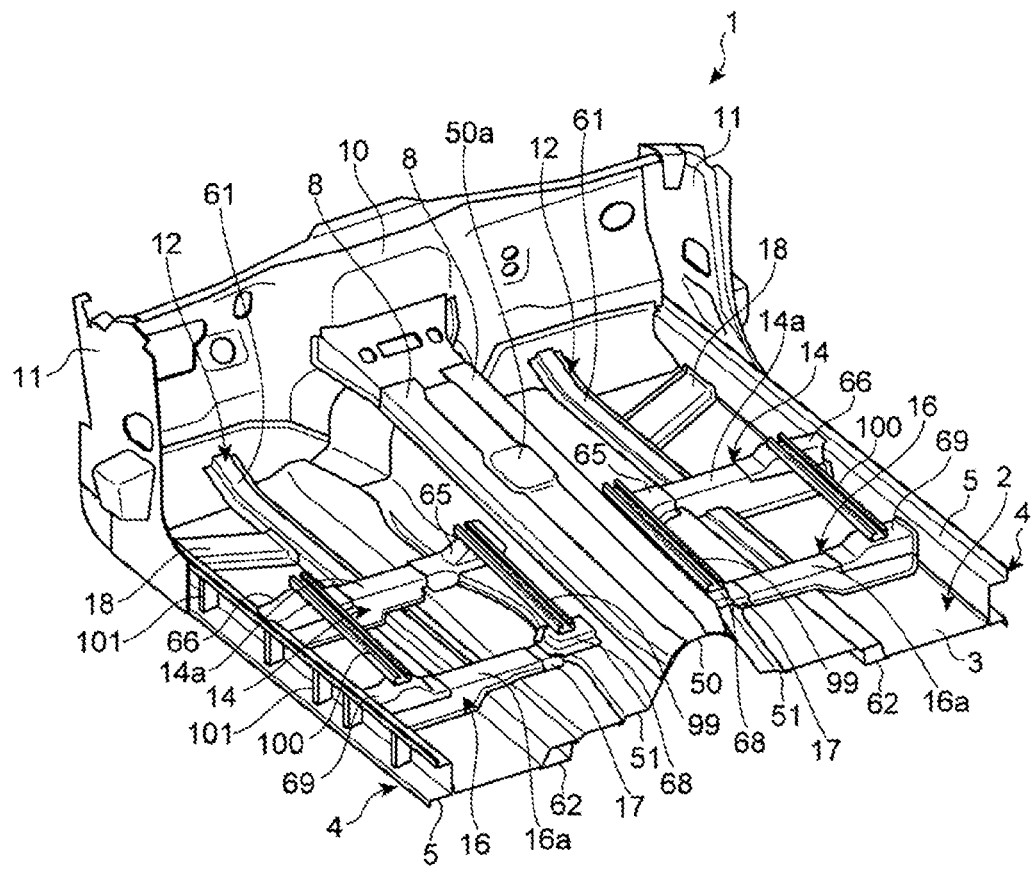
FIG. 1 is a perspective view showing a lower vehicle-body structure according to an embodiment of the present invention.
Figure 1:
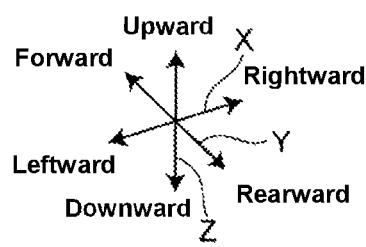
Figure 2:
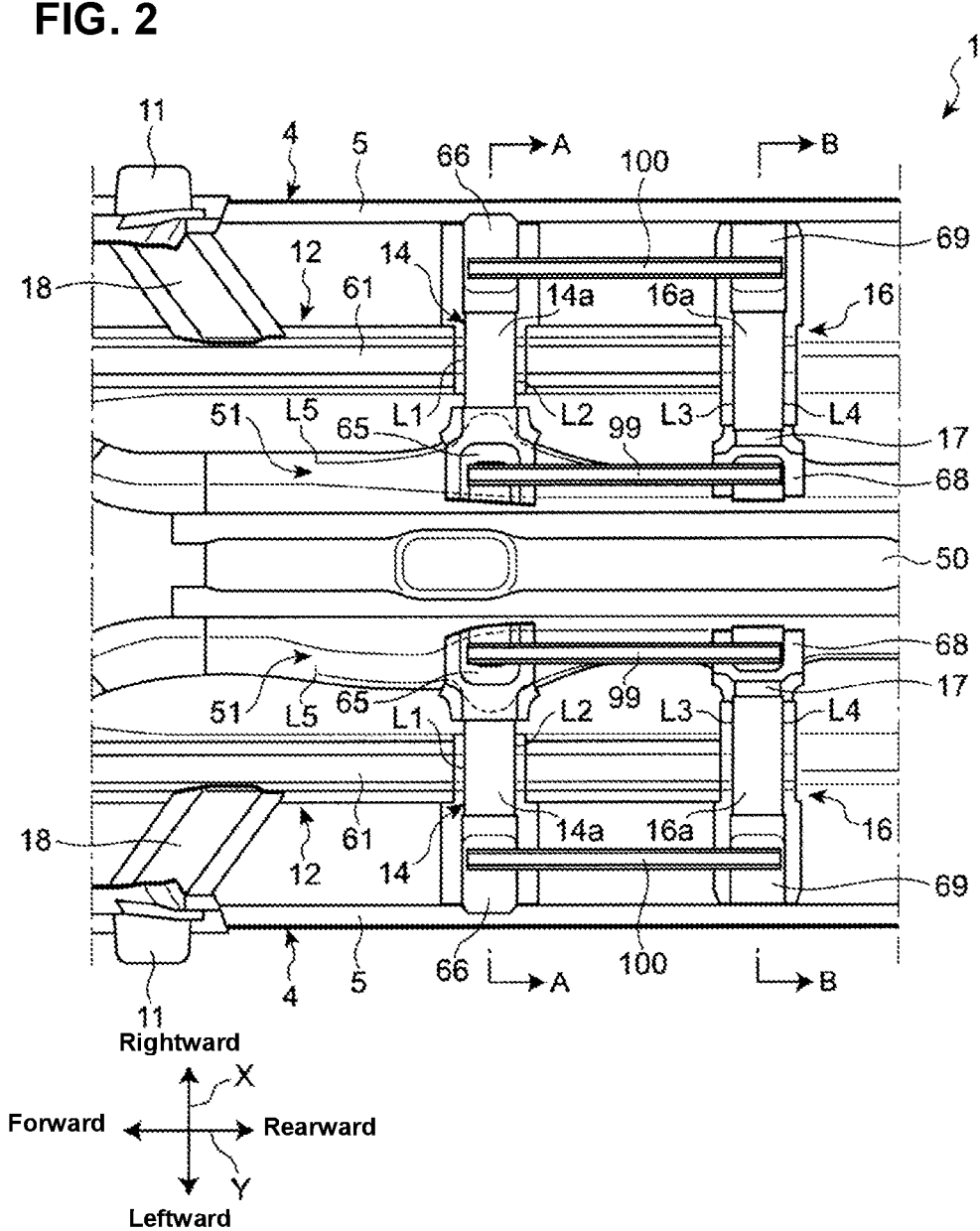
FIG. 2 is a plan view showing the lower vehicle-body structure according to the embodiment.
Figure 3:
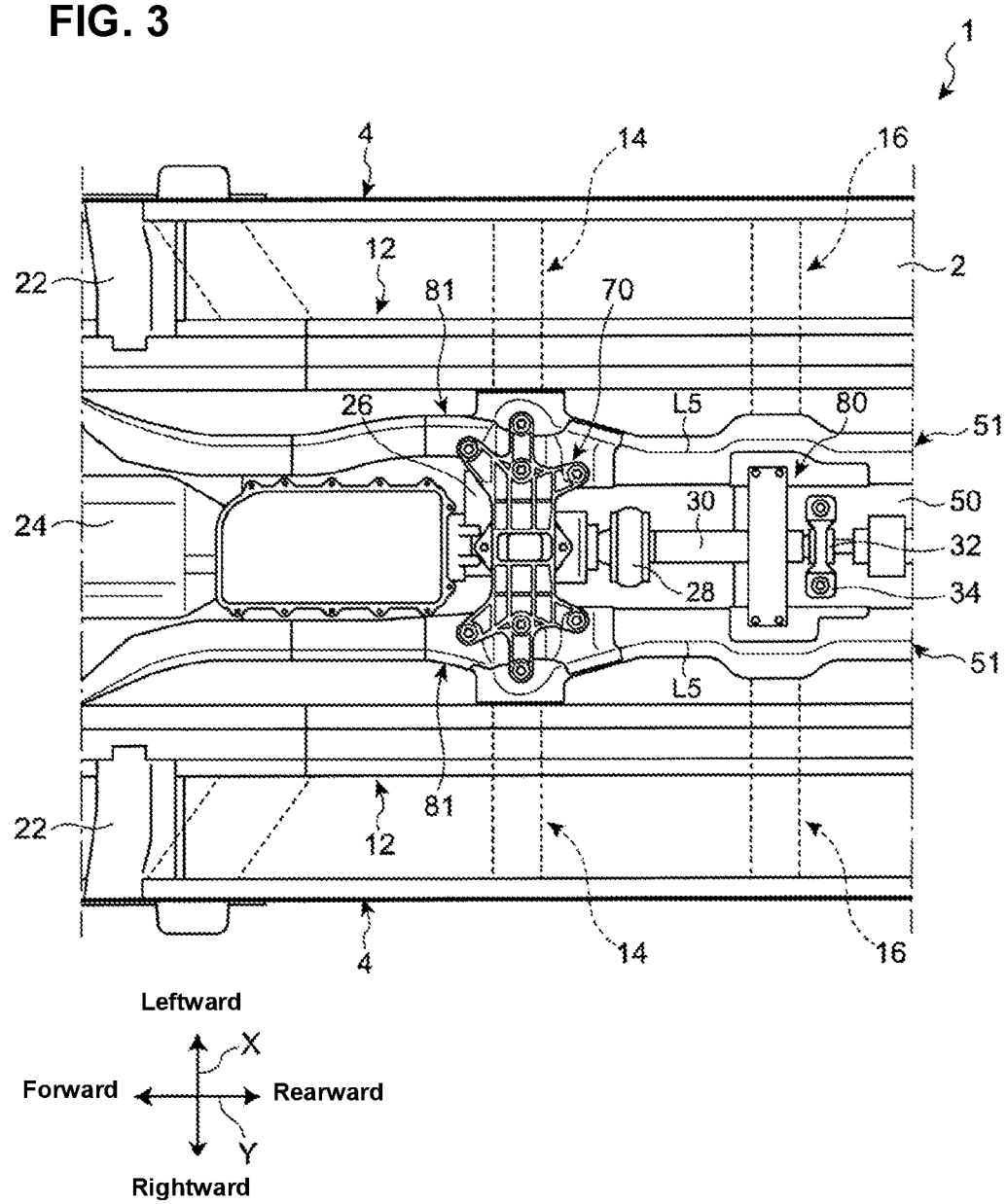
FIG. 3 is a bottom view showing the lower vehicle-body structure according to the embodiment.

FIG. 1 is a perspective view showing a lower vehicle-body structure according to the embodiment of the present invention. FIG. 2 is a plan view showing the lower vehicle-body structure. FIG. 3 is a bottom view showing the lower vehicle-body structure. In the following description, a vehicle width direction, a vehicle longitudinal direction, and a vehicle vertical direction of an automotive vehicle 1 which is provided with the lower vehicle-body structure according to the present embodiment are respectively referred to as an X direction, a Y direction, and a Z direction.

Referring to FIG. 1, the automotive vehicle 1 provided with the lower vehicle-body structure according to the present embodiment comprises a vehicle floor 2 which constitutes a floor face of a space of a cabin, a pair of side sills 4 which extend in the Y direction along both-side portions, in the X direction, of the vehicle floor 2, and a dash panel 10 which is provided in front of the vehicle floor 2.

Each of the side sills 4 comprises a side sill inner 5 and a side sill outer (not illustrated). The side sill inner 5 is configured to have a hat-shaped cross section which is opened to an outward side in the X direction in a cross section perpendicular to the Y direction. The side sill outer is configured to have a hat-shaped cross section which is opened to an inward side in the X direction in the cross section perpendicular to the Y direction. The side sill inner 5 and the side sill outer are joined together such that a closed cross section which is continuous in the Y direction is formed therebetween.

The automotive vehicle 1 further comprises a pair of hinge pillars 11 which rise from respective front end portions of the right-and-left side sills 4 and extend in the Z direction, and the dash panel 10 is provided between the pair of hinge pillars 11. A cabin space and an engine are partitioned from each other in the Y direction by the dash panel 10.

The vehicle floor 2 comprises a top face portion 3 and a bottom face portion 3a, and a floor tunnel 50 which is configured to protrude upwardly, in the Z direction, from the top face portion 3 and extend in the Y direction. The floor tunnel 50 is provided to extend in the Y direction at a central portion, in the X direction, of the vehicle floor 2. A shape of a cross section of the floor tunnel 50, when viewed from the Y direction, is U-shaped which is opened to a downward side of the Z direction.

A opening portion 50a for insertion of a shift lever (not illustrated) is formed at an upper face portion of the floor tunnel 50. A pair of reinforcing members 8 which are configured to extend in the Y direction are joined to both-side portions, in the X direction, of the upper face portion of the floor tunnel 50 by welding, for example, whereby the rigidity of the floor tunnel 50 is increased.

A pair of right-and-left floor frames 12 which extend in the Y direction are joined to the top face portion 3 of the vehicle floor 2. Each of the floor frames 12 is provided between the floor tunnel 50 and the side sill 4 in the X direction. In other words, each of the floor frames 12 is provided on an inward side, in the X direction, of the side sill 4. The floor frame 12 is connected to a front end portion of the side sill 4 via a torque box 22 (shown in FIG. 3).

The floor frame 12 comprises an upper frame member 61 which is joined to an upper face of the vehicle floor 2 by welding, for example, and a lower frame member 62 which is joined to a lower face of the vehicle floor 2 by welding, for example. The upper frame member 61 and the lower frame member 62 are provided to face each other, interposing the vehicle floor 2 therebetween. The upper frame member 61 and the lower frame member 62 are provided to extend in the Y direction, respectively. The lower frame member 62 and the bottom face portion 3a of the vehicle floor 2 jointly form a closed cross section which is continuous in the Y direction. Referring to FIG. 2 as well, the upper frame member 61 of the present embodiment is provided between a second floor cross member 16, which will be described later, and the dash panel 10 in the Y direction. In other words, the upper frame member 61 is not provided on a rearward side, in the Y direction, of the second floor cross member 16.

Referring to FIGS. 1 and 2, a pair of right-and-left first cross members 14 and a pair of right-and-left second floor cross members 16 are joined to the upper face of the top face portion 3 of the vehicle floor 2 as floor cross members extending in the X direction, respectively. The second floor cross members 16 are provided to be spaced apart, rearwardly in the Y direction, from the first floor cross members 14. An inside seat rail 99 and an outside seat rail 100 are provided between the first floor cross member 14 and the second floor cross member 16.

The first floor cross member 14 is provided to extend between the floor tunnel 50 and the side sill 4. In other words, the right-and-left first floor cross members 14 are provided on both sides, in the X direction, of the floor tunnel 50. These both cross members 14 are arranged substantially at the same position in the Y direction.

The first floor cross member 14 is a pressed part which is made of steel, for example, and configured to have a hat-shaped cross section which is opened downwardly in a cross section perpendicular to the X direction. The first floor cross member 14 and the vehicle floor 2 jointly form a closed cross section which is continuous in the X direction. The first floor cross member 14 includes an upper face portion 14a which upwardly faces away from the top face portion 3 of the vehicle floor 2.

The upper face portion 14a of the first floor cross member 14 is provided to extend in the X direction. As shown in FIG. 2, a first front-side ridgeline L1 which extends in the X direction is formed at a front edge portion of the upper face portion 14a, and a first rear-side ridgeline L2 which extends in the X direction is formed at a rear edge portion of the upper face portion 14a.

Referring to FIGS. 1 and 2, a first inside seat bracket (attaching member) 65 to support the inside seat rail 99 is joined to an inside end portion, in the X direction, of the first floor cross member 14. The first floor cross member 14 is connected to the floor tunnel 50 via the first inside seat bracket 65. Further, a first outside seat bracket (attaching member) 66 is joined to an outside end portion, in the X direction, of the first floor cross member 14. The first floor cross member 14 is connected to the side sill 5 via the first outside seat bracket 66. The first inside seat bracket 65 and the first outside seat bracket 66 are respectively a pressed part made of steel, for example.

The second floor cross member 16 is provided to extend between the floor tunnel 50 and the side sill 4. In other words, the right-and-left first floor cross members 16 are provided on both sides, in the X direction, of the floor tunnel 50. These both cross members 16 are arranged substantially at the same position in the Y direction.

The second floor cross member 16 is a pressed part which is made of steel, for example, and configured to have a hat-shaped cross section which is opened downwardly in a cross section perpendicular to the X direction. The second floor cross member 16 and the vehicle floor 2 jointly form a closed cross section which is continuous in the X direction. The second floor cross member 16 includes an upper face portion 16a which upwardly faces away from the top face portion 3 of the vehicle floor 2.

The upper face portion 16a of the second floor cross member 16 is provided to extend in the X direction. As shown in FIG. 2, a second front-side ridgeline L3 which extends in the X direction is formed at a front edge portion of the upper face portion 16a, and a second rear-side ridgeline L4 which extends in the X direction is formed at a rear edge portion of the upper face portion 16a.

A connecting member 17 is joined to an inside end portion, in the X direction, of the second floor cross member 16 by welding, for example. The connecting member 17 is a pressed part made of steel, for example, and configured to have a hat-shaped cross section opened downwardly in the cross section perpendicular to the X direction. The connecting member 17 and the vehicle floor 2 jointly form a closed cross section which is continuous in the X direction. Further, the connecting member 17 includes an upper face portion which extends in the X direction, and two ridgelines which are respectively continuous to the second front-side ridgeline L3 and the second rear-side ridgeline L4 of the second floor cross member 16 are formed at this upper face portion. Herein, the connecting member 17 may be formed integrally with the second floor cross member 16.

As shown in FIG. 2, a frame structure is formed at the vehicle floor 2 by means of the first floor cross members 14 and the second floor cross members 16 which extend in the X direction and the floor frames 12 and the side sills 4 which extend in the Y direction.

A second inside seat bracket (attaching member) 68 to support the inside seat rail 99 is joined to the connecting member 17 joined to the inside end portion, in the X direction, of the second floor cross member 16. The second floor cross member 16 is connected to the floor tunnel 50 via the second inside seat bracket 68 and the connecting member 17. Further, a second outside seat bracket (attaching member) 69 is joined to an outside end portion, in the X direction, of the second floor cross member 16. The second floor cross member 16 is connected to the side sill inner 5 via the second outside seat bracket 69. The second inside seat bracket 68 and the second outside seat bracket 69 are respectively a pressed part made of steel, for example.

A pair of inside seat rails 99 are provided at both sides (right side and left side), in the X direction, of the floor tunnel 50. Likewise, a pair of outside seat rails 100 are provided at both sides (right side and left side), in the X direction, of the floor tunnel 50. A pair of front seats (not illustrated) which are provided on the right-and-left sides of the floor tunnel 50 are supported at the inside seat rails 99 and the outside seat rails 100 from a downward side so as to slide in the Y direction. Each of the inside seat rail 99 and each of the outside seat rails 100 are provided to be spaced apart from each other in the X direction and extend in the Y direction. The inside seat rail 99 and the outside seat rail 100 are respectively a pressed part made of steel, for example, and configured to have a roughly C-shaped cross section which is opened upwardly in the cross section perpendicular to the Y direction.

The inside seat rail 99 is fixed to the first inside seat bracket 65 at its front end portion and fixed to the second inside seat bracket 68 at its rear end portion. The outside seat rail 100 is fixed to the first outside seat bracket 66 at its front end portion and fixed to the second outside seat bracket 69 at its rear end portion.

Further, a pair of right-and-left oblique frames 18 are joined to the upper face portion 3 of the vehicle floor 2 by welding, for example. This oblique frame 18 is provided to extend obliquely inwardly and rearwardly in front of the first floor cross member 14. The oblique frame 18 is provided to interconnect the floor frame 12 and the side sill 4. A connection portion of the oblique frame 18 to the side sill 4 is provided to overlap the hinge pillar in the Y direction. The oblique frame 18 is configured to have a hat-shaped cross section opened downwardly in a cross section which is perpendicular to a longitudinal direction of the oblique frame 18, and the oblique frame 18 and the vehicle floor 2 jointly form a closed cross section which is continuous in the longitudinal direction of the oblique frame 18.

Referring to FIG. 3, a mount member 70 and a tunnel member 80 as connecting members are joined to the lower face of the vehicle floor 2. The mount member 70 is provided to extend in the X direction and located at a position which corresponds to the first floor cross member 14 in the Y direction. The tunnel member 80 is provided to extend in the X direction and located at a position which corresponds to the second floor cross member 16 in the Y direction.

Further, a ladder-shaped structure is formed at the vehicle floor 2 by means of the first floor cross members 14, the second floor cross member 16, the mount member 70 and the tunnel member 80 which respectively extend in the X direction, and a pair of an upper step portions 51 (described later), a pair of floor frames 12 and a pair of side sills 4 which respectively extend in the Y direction. This ladder-shaped structure is configured to extend in the X direction across the floor tunnel 50.

Herein, as shown in FIG. 3, a pair of tunnel side reinforcements (reinforcing member) 81 which extend in the Y direction are provided at the lower face of the vehicle floor 2. Each of the tunnel side reinforcements 81 and the vehicle floor 2 jointly form a closed cross section. Each of the tunnel side reinforcements 81 is located at a position which overlaps the mount member 70 in the Y direction.

The automotive vehicle 1 provided with the lower vehicle-body structure of the present embodiment is a FR type of automotive vehicle equipped with a longitudinally-disposed type of powertrain, for example. The powertrain of the present lower vehicle-body structure comprises an engine (not illustrated) as a power source which is installed in the engine room at a position located in front of the dash panel 10 (see FIG. 1) and a transmission 24 which is rearwardly coupled to the engine.

The transmission 24 is a longitudinally-disposed type of automatic transmission, for example, and comprises an output shaft (not illustrated) which extends in the Y direction. However, this transmission 24 may be a manual transmission. A rear end portion of the output shaft of the transmission 24 is coupled to a propeller shaft 30 which extends in the Y direction via a flexible joint 28. Thus, a power of the engine is transmittable to rear wheels through a power transmitting mechanism, such as the transmission 24 and the propeller shaft 30.

The propeller shaft 30 is disposed inside the floor tunnel 50. The propeller shaft 30 is supported at a lower face of the floor tunnel 50 via a shaft bearing 32 and a support member 34.

At least a part of a rear-end side of the transmission 24 is disposed inside the floor tunnel 50 as well. A supported portion 26 which is supported by the mount member 70 (first connecting member) from an downward side of the floor panel 50 is provided at a rear end of the transmission 24. This supported portion 26 is provided near the rear end portion of the transmission 24.

As described above, the mount member 70 is fixed to the vehicle floor 2 at a position which overlaps the first floor cross member 14 in the Y direction. Thus, a rear portion of the transmission 24 is supported at a vehicle body via the mount member 70. Herein, a front portion of the transmission 24 is supported at the vehicle body (a front suspension member, for example) via the engine and an engine mount (not illustrated). The mount member 70 and its fixation structure will be described later.

[Surrounding Structure of Mount Member]

Figure 4:
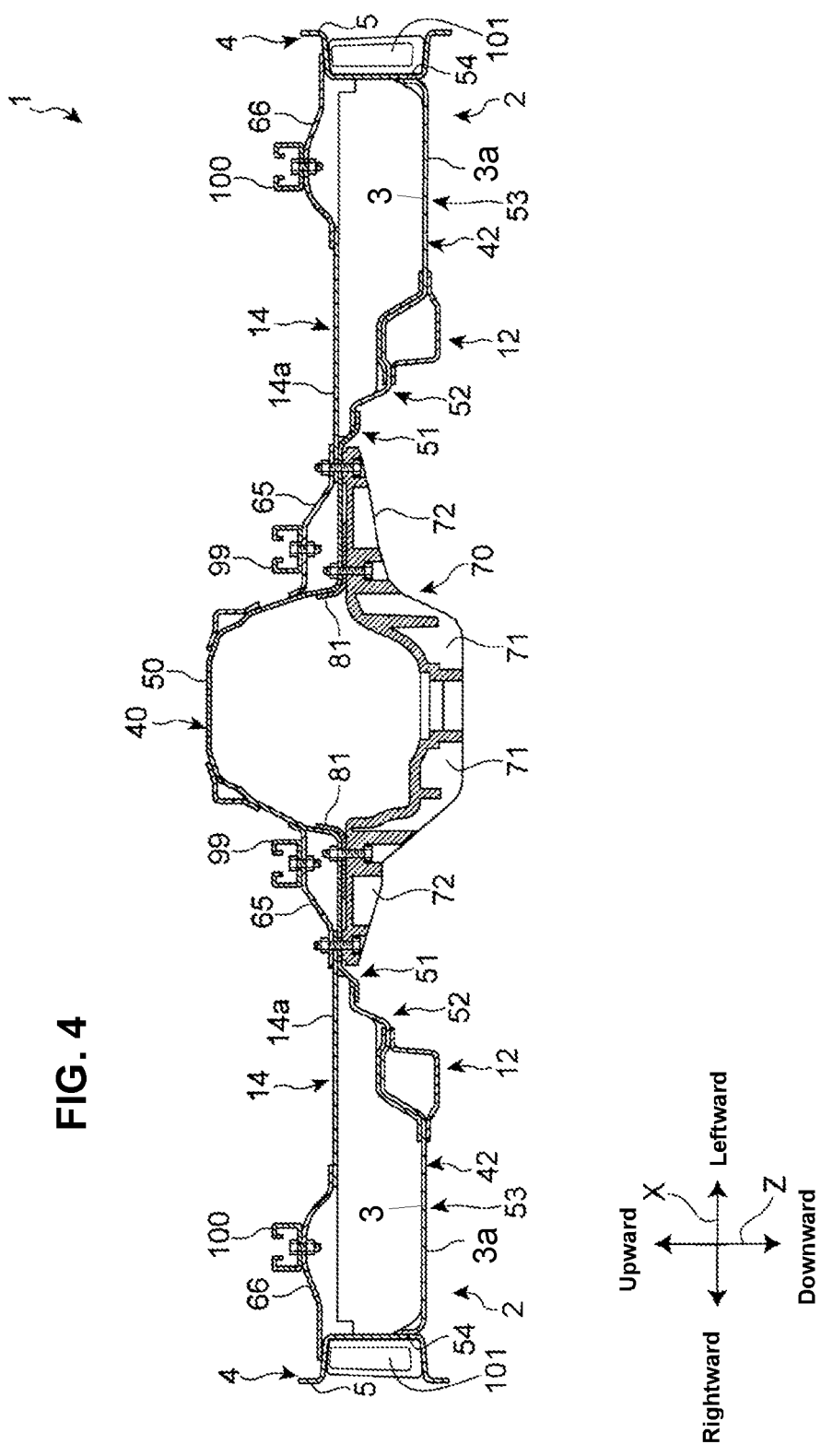
FIG. 4 is a sectional view taken along line A-A of FIG. 2.
Figure 5:
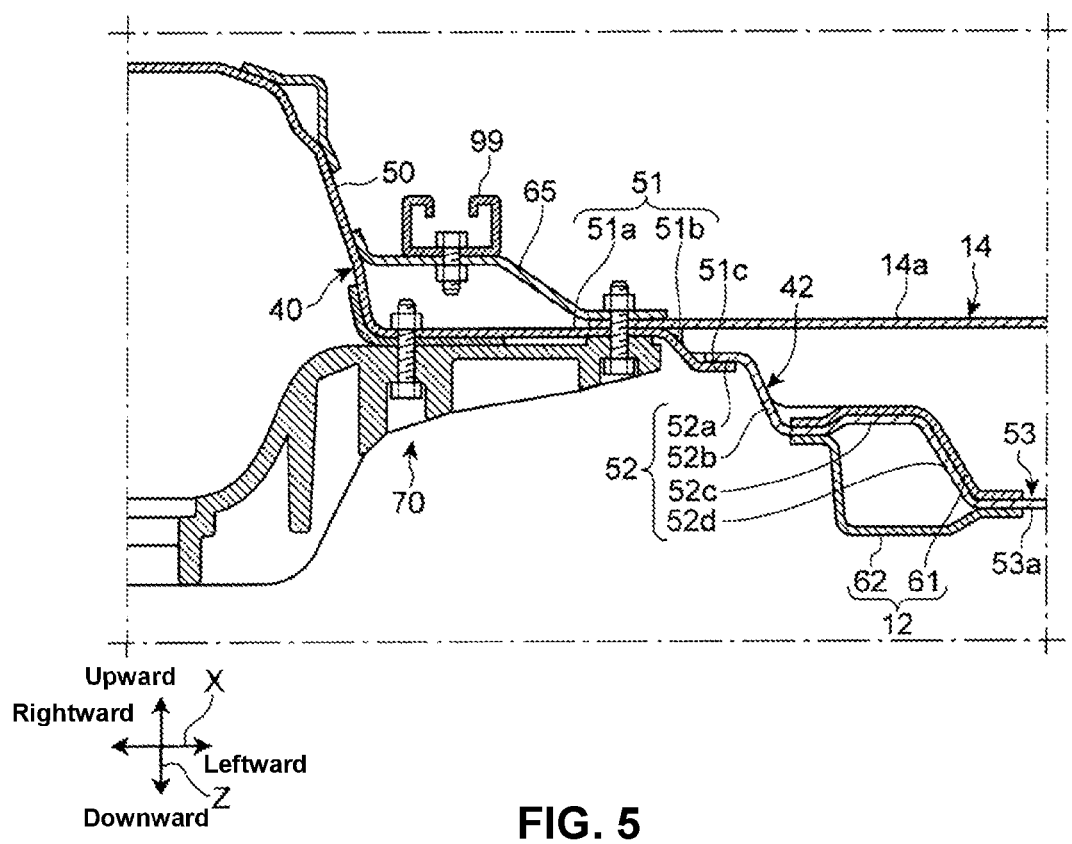
FIG. 5 is a partial enlarged sectional view of FIG. 4.

FIG. 4 is a sectional view taken along line A-A of FIG. 2. FIG. 5 is a partial enlarged sectional view of FIG. 4. Referring to FIGS. 4 and 5, a portion, in the Y direction, of the vehicle floor 2 where the mount member 70 and the first floor cross member 14 are provided and its surrounding area will be described.

As shown in FIG. 4, the vehicle floor 2 comprises a tunnel panel 40 which constitutes the floor tunnel 50 and a pair of right-and-left bottom face panels 42 which constitute the bottom face portion 3*a*. The tunnel panel 40 is provided at a central portion, in the X direction, of the vehicle floor 2 between the right-and-left side sills 4. Each of the bottom face panels 42 is provided to interconnect the tunnel panel 40 and the side sill 4.

The tunnel panel 40 and the bottom face panel 42 are respectively a pressed part made of steel, for example. It is preferable that the tunnel panel 40 have the higher rigidity and strength than the bottom face panel 42, whereby the rigidity and strength of the floor tunnel 50 can be improved.

The vehicle floor 2 further includes a pair of upper step portions 51 which are configured to rise inwardly, in the X direction, from the top face portion 3 and be continuous to a lower edge portion of the floor tunnel 50. Referring to FIGS. 1 through 3, the upper step portion 51 is configured to extend in the Y direction along the lower edge portion of the floor tunnel 50 from a forward side of the first floor cross member 14 to a rearward side of the second floor cross member 16. Further, as shown in FIGS. 2 and 3, a ridgeline L5 is formed at the upper step portion 51. As shown in FIG. 3, the mount member 70 is fixed to the upper step portion 51.

Thus, the upper step portion 51 integrally formed with the vehicle floor 2 is provided at a boundary area between the top face portion 3 and the lower edge portion of the floor tunnel 50, whereby the rigidity is increased.

Herein, referring to FIG. 3, the tunnel side reinforcement 81 is provided along the boundary area of the top face portion 3 and the lower edge portion of the front tunnel 50. The tunnel side reinforcement 81 is located at the position which overlaps the mount member 70 of the upper step portion 51.

Referring to FIG. 5, the upper step portion 51 comprises a first lateral plate portion 51*a* which is configured to extend outwardly, in the X direction, from the lower end portion of the floor tunnel 50 and a first slant portion 51*b* which is configured to extend obliquely downwardly, in the Z direction, from an outside end portion, in the X direction, of the first lateral plate portion 51a. Herein, the first slant portion 51b may be configured to extend downwardly, in the Z direction. The mount member 70 is fixed to the first lateral plate portion 51a of the upper step portion 51.

In the present embodiment, the first lateral plate portion 51a and the first slant portion 51b of the upper step portion 51 are constituted by a part of the tunnel panel 40. The tunnel panel 40 further comprises an extension portion 51c which extends outwardly, in the X direction, from a lower end portion of the first slant portion 51b. The extension portion 51c is joined to the bottom face panel 42 by welding, for example.

Herein, the upper step portion 51 may be configured by a part of the bottom face panel 42 or a different member from the tunnel panel 40 and the bottom face panel 42.

Referring to FIG. 4, the bottom face portion 3 of the vehicle floor 2 comprises a pair of right-and-left middle step portions 52 which are continuous to an outside portion, in the X direction, of the upper step portion 51, a pair of right-and-left lower step portions 53 which are continuous to an outside portion, in the X direction, of the middle step portion 52, and a joined portion 54 which is joined to the side sill 4 on the outside, in the X direction, of the lower step portion 53.

Referring to FIG. 5, the middle step portion 52 comprises a second lateral plate portion 52a which is configured to extend in the X direction and a second slant portion 52b which is configured to extend obliquely outwardly, in the X direction, and downwardly, in the Z direction, from an outside end portion of the second lateral plate portion 52a. Further, the middle step portion 52 comprises a third lateral plate portion 52c which is configured to extend outwardly, in the X direction, from an outside end portion, in the X direction, of the second slant portion 52c and a third slant portion 52d which is configured to extend obliquely outwardly, in the X direction, and downwardly, in the Z direction, from an outside end portion of the third lateral plate portion 52c. The second lateral plate portion 52a of the middle step portion 52 is joined to an upper face of the extension portion 51c of the tunnel panel 40. Thus, an inside end portion, in the X direction, of the second lateral plate portion 52a of the middle step portion 52 is connected to a lower end portion of the first slant portion 51b of the upper step portion 51 via the extension portion 51c.

The upper frame member 61 and the lower frame member 62 which constitute the floor frame 12 are provided to face each other, interposing the third lateral plate portion 52c and the third slant portion 52d of the middle step portion 52 therebetween.

The lower step portion 53 comprises a fourth lateral plate portion 53a which extends outwardly, in the X direction, from a lower end portion of the third slant portion 52d of the middle step portion 52. The fourth lateral plate portion 53a of the lower step portion 53 constitutes a lowermost part of the vehicle floor 2.

The upper frame member 61 and the lower frame member 62 of the floor frame 12 are joined to the third lateral plate portion 52c of the middle step portion 52 and the fourth lateral plate portion 53a of the lower step portion 53 by welding, whereby the members 61, 62 are fixed to the bottom face panel 42.

Referring to FIG. 4, the joined portion 54 is provided to extend upwardly from an outside end portion, in the X direction, of the lower step portion 53. The joined portion 54 is joined to a cabin-side face of the side sill inner 5 of the side sill 4 by welding, for example.

Thus, the lower step portion 53 is located at a lower level than the joined portion 54 joined to the side sill 4 in the Z direction. Accordingly, a sectional area of the closed cross section formed between the vehicle floor 2 and the first floor cross member 14 is enlarged in an area of the X direction where the lower step portion 53 is provided, so that the rigidity improvement of the first floor cross member 14 is attained.

Herein, the sectional shape of the vehicle floor 2 taken along line A-A of FIG. 2 is not limited to the structure shown in FIGS. 4 and 5 but changeable. For example, the middle step portion 52 provided between the upper step portion 51 and the lower step portion 53 may be formed in one stage or three or more stages, or may be omitted. Further, while the lower step portion 53 is located at the lower level than the joined portion 54 in the present embodiment, the fourth lateral plate portion 53a of the lower step portion 53 may be located at a level which overlaps the joined portion 54 or at a higher level than the joined portion 54.

As shown in FIG. 5, the upper face portion 14a of the first floor cross member 14 with the first front-side ridgeline L1 and the first rear-side ridgeline L2 (see FIGS. 1 and 2) is located at a higher level than the middle step portion 52 and the lower step portion 53 of the vehicle floor 2 and also substantially at the same level as the first lateral plate portion 51a of the upper step portion 51.

Further, as shown in FIG. 4, the floor frame 12, the first floor cross member 14, and the side sill 4 are positioned such that these overlap in the Z direction.

Referring to FIGS. 4 and 5, the first inside seat bracket 65 is joined to an outside face of the floor tunnel 50 by welding, for example, at an inside end portion, in the X direction, thereof. As shown the most apparently in FIG. 5, an outside end portion, in the X direction, of the first inside seat bracket 65 is jointly fastened with the first floor cross member 14, the first lateral plate portion 51a of the upper step portion 51, and the mount member 70. Thereby, the first floor cross member 14 is connected to the floor tunnel 50 via the first inside seat bracket 65.

Referring to FIG. 4, an inside end portion, in the X direction, of the first outside seat bracket 66 is joined to the upper face portion 14a of the first floor cross member 14 by welding, for example. An outside end portion, in the X direction, of the first outside seat bracket 66 is joined to the inside face of the side sill inner 5 of the side sill 4 by welding, for example.

[Surrounding Structure of Tunnel Member]

Figure 6:
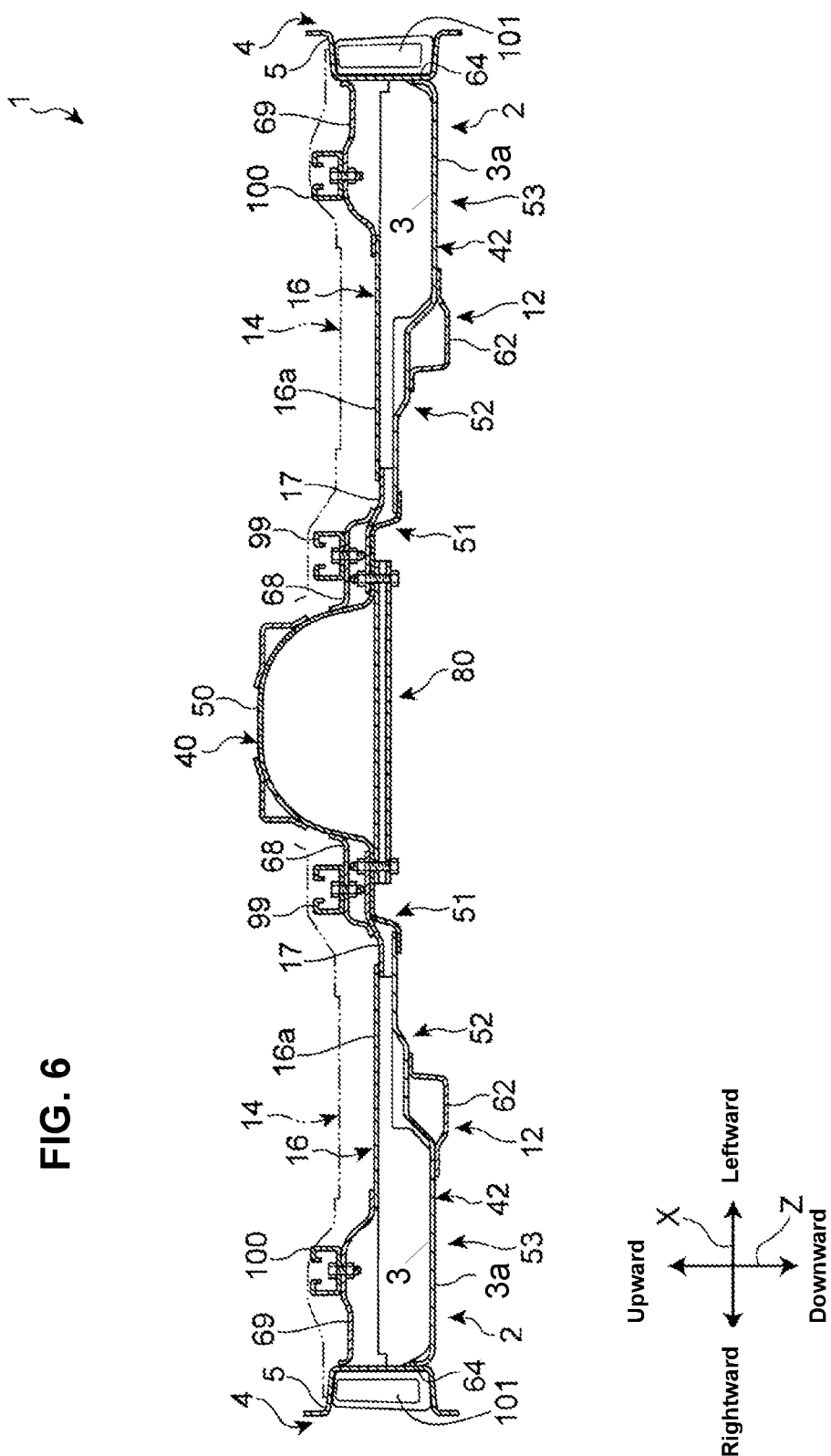
FIG. 6 is a sectional view taken along line B-B of FIG. 2.
Figure 7:
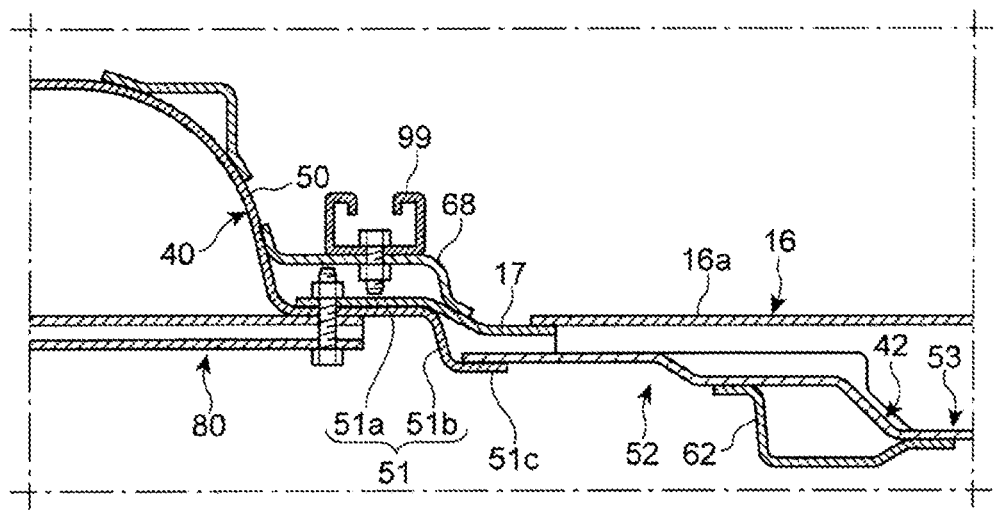
FIG. 7 is a partial enlarged sectional view of FIG. 6.
Figure 7:
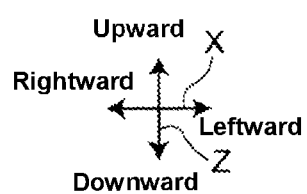

FIG. 6 is a sectional view taken along line B-B of FIG. 2. FIG. 7 is a partial enlarged sectional view of FIG. 6. Referring FIGS. 6 and 7, a portion, in the Y direction, of the vehicle floor 2 where the tunnel member 80 and the second floor cross member 16 are provided and its surrounding arear will be described. The cross section of the vehicle floor 2 shown in FIGS. 6 and 7 is similar to the cross section of the vehicle floor 2, specific description of which is omitted here.

Referring to FIG. 6, the tunnel member 80 is fixed to the upper step portion 51. More specifically, the tunnel member 80 is fixed to a lower face of the first lateral plate portion 51a of the upper step portion 51 as shown in FIG. 7.

Referring to FIGS. 6 and 7, the connecting member 17 is joined to the inside end portion, in the X direction, of the second floor cross member 16 as described above. The inside end portion, in the X direction, of the connecting member 17 is fixed to the first lateral plate portion 51a of the upper step portion 51 and the tunnel member 80, whereby the upper step portion 16*a* of the second floor cross member 16 is connected to the first lateral plate portion 51*a* of the upper step portion 51. Herein, the connecting member 17 may be formed integrally with the second floor cross member 16.

Since the upper frame member 61 is provided on the forward side, in the Y direction, of the second floor cross member 16 as described above (see FIG. 2), the upper frame member 61 which constitutes the floor frame 12 is not provided in the cross section shown in FIGS. 6 and 7. The closed cross section is formed by the bottom face panel 42 and the lower frame member 62.

As shown in FIG. 7, the upper face portion 16*a* of the second floor cross member 16 with the second front-side ridgeline L3 and the second rear-side ridgeline L4 (see FIGS. 1 and 2) is located at a higher level than the middle step portion 52 and the lower step portion 53 of the vehicle floor 2 and also substantially at the same level as the first lateral plate portion 51*a* of the upper step portion 51.

The second inside seat bracket 68 is joined to the outside face of the floor tunnel 50 by welding, for example, at an inside end portion, in the X direction, thereof, and connected to the connecting member 17 by welding, for example, at an outside end portion, in the X direction, thereof. Thereby, the second floor cross member 16 is connected to the floor tunnel 50 via the second inside seat bracket 68 and the connecting member 17.

As shown in FIG. 6, an inside end portion, in the X direction, of the second outside seat bracket 69 is joined to the upper face portion 16*a* of the second floor cross member 16 by welding, for example. An outside end portion, in the X direction, of the second outside seat bracket 69 is joined to the inside face of the side sill inner 5 of the side sill 4 by welding, for example.

Referring to FIG. 6, the floor frame 12, the first floor cross member 14, the second floor cross member 16, and the side sill 4 are provided such that these overlap in the Z direction. That is, a frame-shaped structure which is formed, at the vehicle floor 2, by the floor frame 12 and the side sill 4 which respectively extend in the Y direction and the first floor cross member 14 and the second floor cross member 16 which respectively extend in the X direction is configured such that it is not offset in the Z direction.

[Mount Member]

Figure 8:
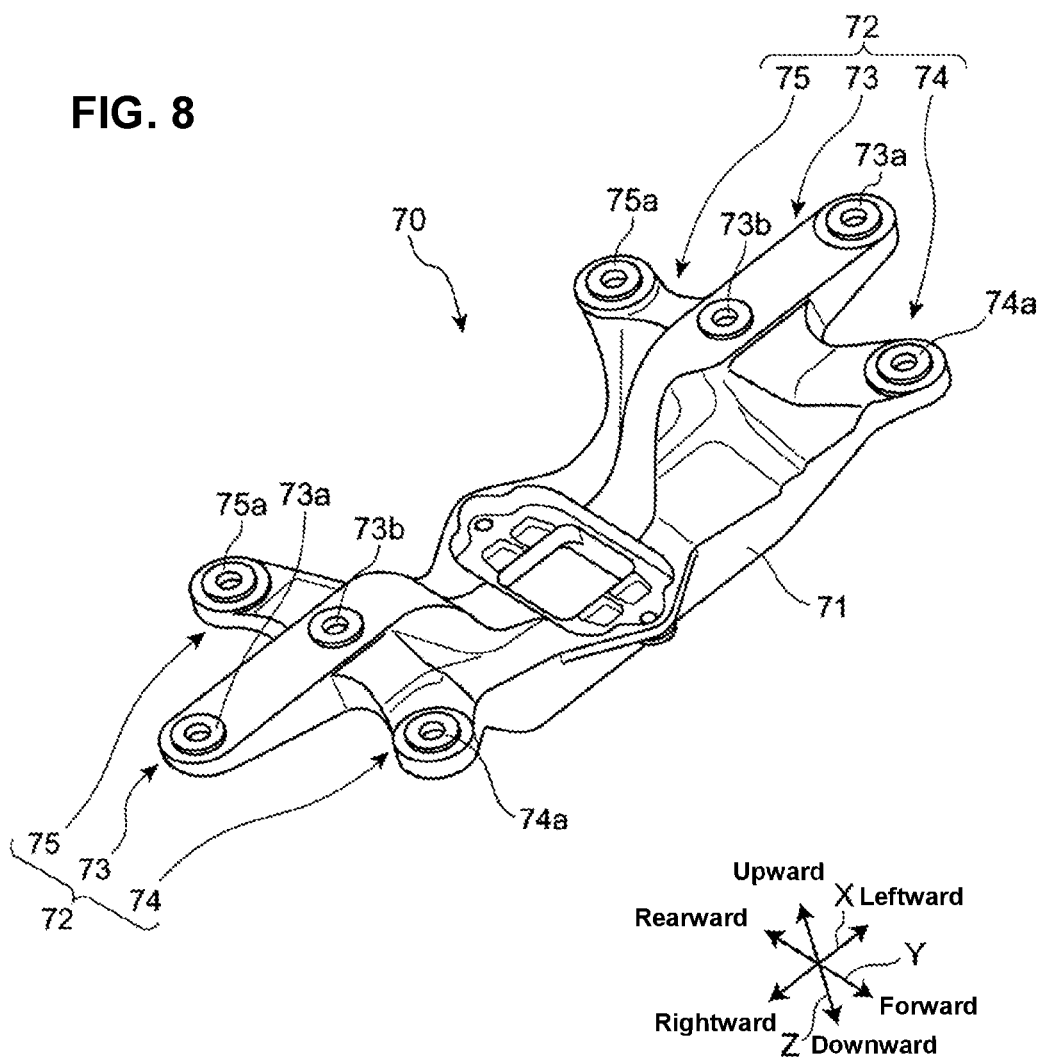
FIG. 8 is a perspective view of a mount member according to the embodiment.
Figure 9:
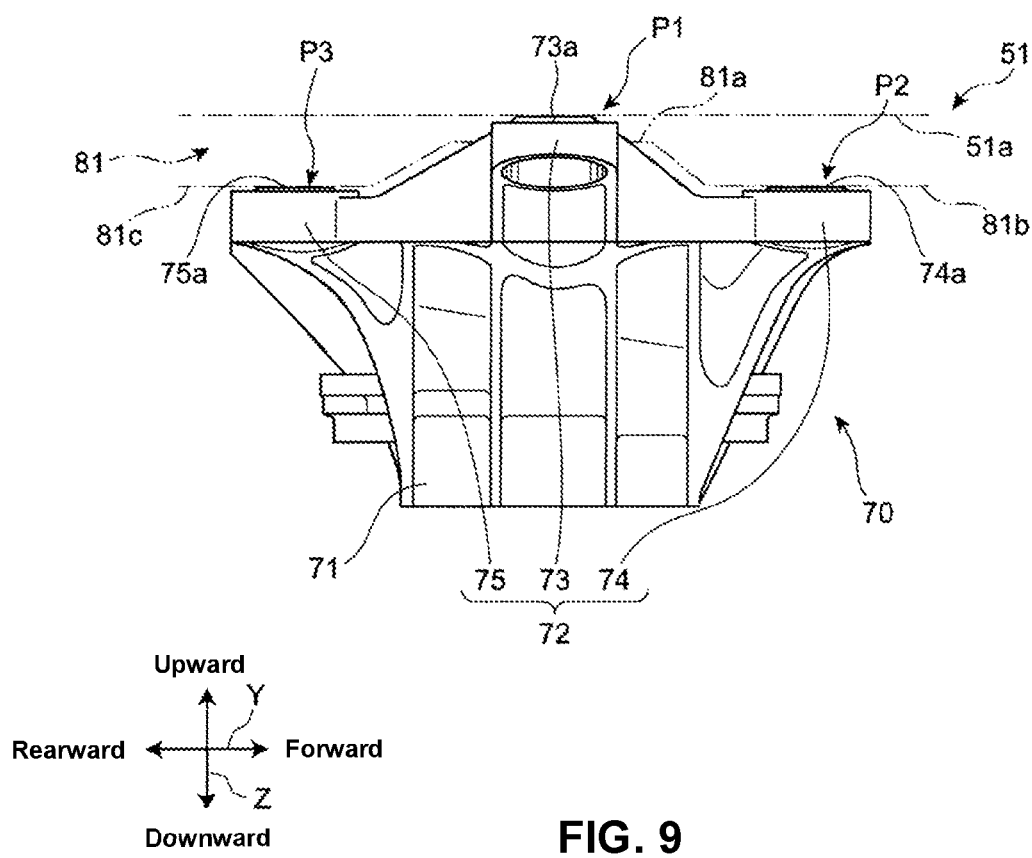
FIG. 9 is a side view of the mount member according to the embodiment.

FIG. 8 is a perspective view of the mount member 70 according to the present embodiment. FIG. 9 is a side view of the mount member 70 of the present embodiment, when viewed from a right side in the X direction, of the vehicle body. A structure of the mount member 70 will be described referring to FIGS. 8 and 9. In FIGS. 8 and 9, the vehicle width direction, the vehicle longitudinal direction, and the vehicle vertical direction in a case where the mount member 70 is attached to the vehicle floor 2 (see FIG. 3) are shown as the X direction, the Y direction, and the Z direction, respectively.

Referring to FIG. 8, the mount member 70 is a casting part made of aluminum alloy, for example. The mount member 70 comprises a base part 71 which extends in the X direction and a fixation part 72 which is provided at both end portions, in the X direction, of the base part 71.

The base part 71 is configured to protrude downwardly in the Z direction, which is of a curved shape, when viewed from the Y direction. The transmission 24 (shown in FIG. 3) is supported at the vehicle floor 2 (shown in FIG. 3) via the base part 71 of the mount member 70.

Each of the fixation parts 72 comprises a first protrusion portion 73 which is provided at a central portion, in the Y direction, of the base part 71, a second protrusion portion 74 which is provided to be forwardly spaced, in the Y direction, apart from the first protrusion portion 73, and a third protrusion portion 75 which is provided to be rearwardly spaced, in the Y direction, apart from the first protrusion portion 73.

The first protrusion portion 73 is configured to protrude outwardly, in the X direction, from the base part 71. The first protrusion portion 73 includes an outside fixation point 73*a* and an inside fixation point 73*b*, where the mount member 70 is fixed to the vehicle floor 2.

The outside fixation point 73*a* is positioned at an outside end portion, in the X direction, of the first protrusion portion 73. The outside fixation point 73*a* has a through (penetration) hole where the first protrusion portion 73 is inserted in the Z direction.

The inside fixation point 73*b* is provided to be spaced, in the X direction, apart from the outside fixation point 73*a*. A through hole where the first protrusion portion 73 is inserted in the Z direction is formed at the inside fixation point 73*b*. The inside fixation point 73*b* is located substantially at the same level, in the Z direction, as the outside fixation point 73*a*.

The second protrusion portion 74 is configured to protrude outwardly, in the X direction, and forwardly, in the Y direction, from the base part 71. An outside end portion, in the X direction, of the second protrusion portion 74 has a fixation point 74*a* where the mount member 70 is fixed to the vehicle floor 2. This fixation point 74*a* has a through hole where the second protrusion portion 74 is inserted in the Z direction.

The third protrusion portion 75 is configured to protrude outwardly, in the X direction, and rearwardly, in the Y direction, from the base part 71. An outside end portion, in the X direction, of the third protrusion portion 75 has a fixation point 75*a* where the mount member 70 is fixed to the vehicle floor 2. This fixation point 75*a* has a through hole where the third protrusion portion 75 is inserted in the Z direction.

As shown in FIG. 9, the outside fixation point 73*a* of the first protrusion portion 73, the fixation point 74*a* of the second protrusion portion 74, and the fixation point 75*a* of the third protrusion portion 75 are located at different levels, in the Z direction, from each other in a state where the mount member 70 is attached to the vehicle floor 2 (shown in FIG. 3). Specifically, the outside fixation point 73*a* of the first protrusion portion 73 is located a higher level than the fixation point 74*a* of the second protrusion portion 74 and the fixation point 75*a* of the third protrusion portion 75. Herein, since the inside fixation point 73*b* (shown in FIG. 8) of the first protrusion portion 73 is located substantially at the same level, in the Z direction, as the outside fixation point 73*a* as described above, this point 73*b* is provided on an upward side, in the Z direction, of the fixation point 74*a* of the second protrusion portion 74 and the fixation point 75*a* of the third protrusion portion 75.

The fixation point 74*a* of the second protrusion portion 74 and the fixation point 75*a* of the third fixation portion 75 are located substantially at the same position in the Z direction.

[Attachment Structure of Mount Member]

Figure 10:
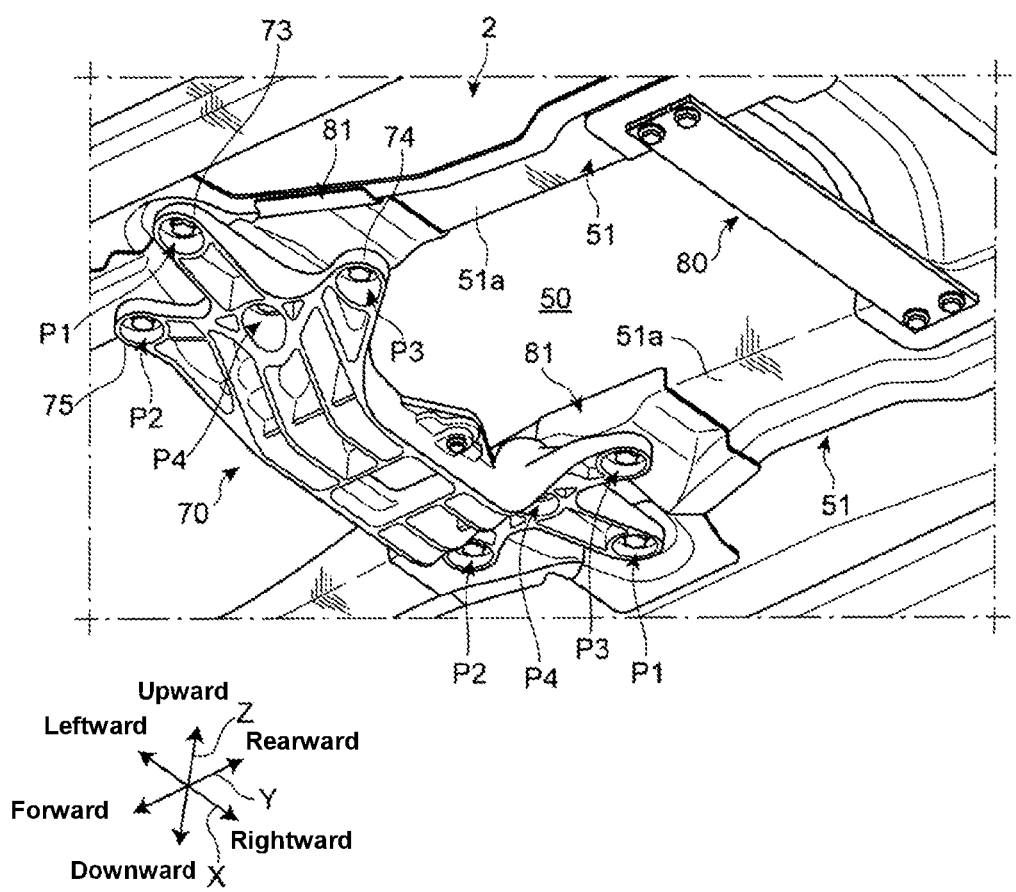
FIG. 10 is a perspective view showing a surrounding area of the mount member according to the embodiment.
Figure 11:
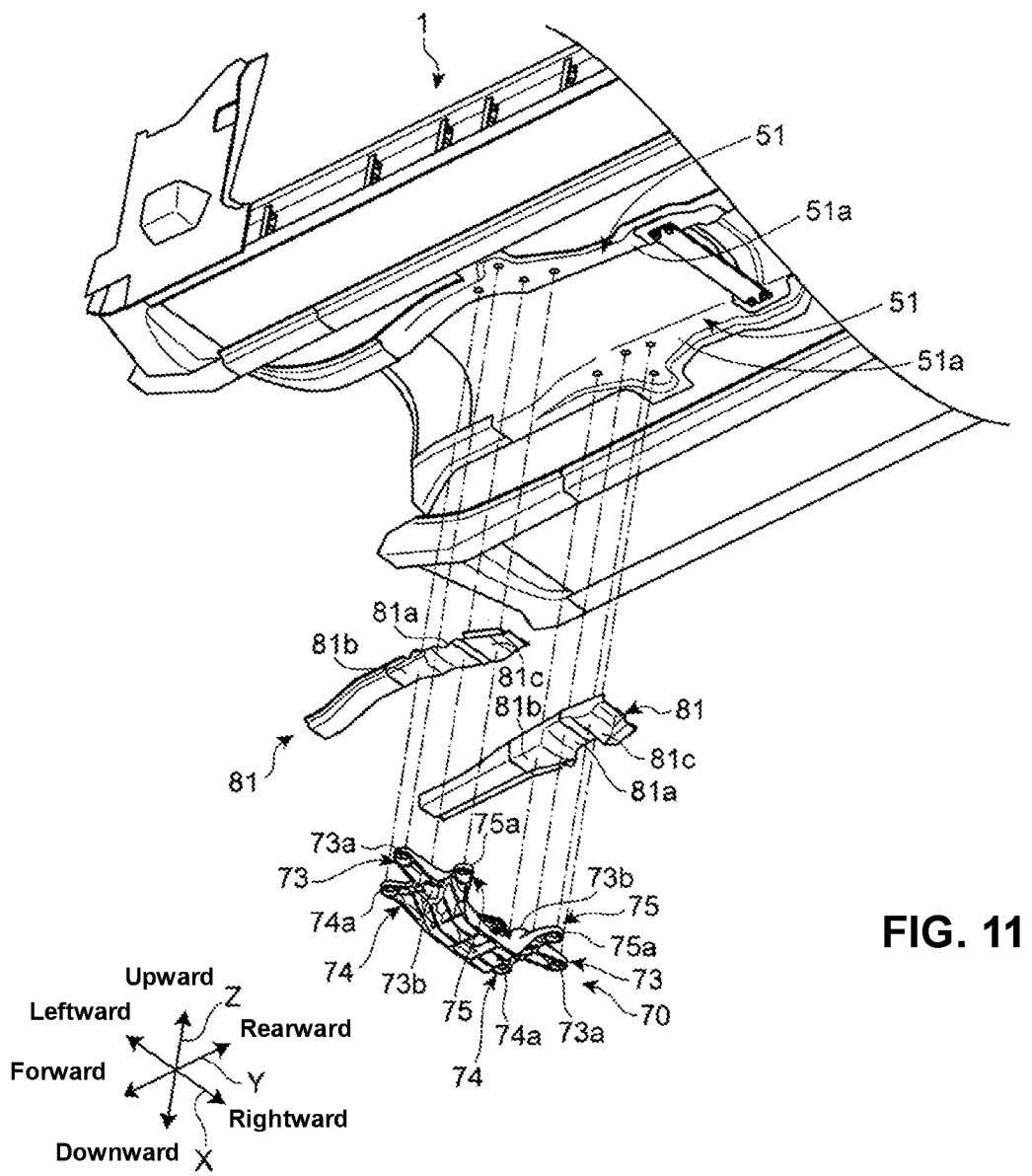
FIG. 11 is an exploded perspective view showing the surrounding area of the mount member according to the embodiment.

FIG. 10 is a perspective view showing a surrounding arear of the mount member 70. FIG. 11 is an exploded perspective view showing the surrounding area of the mount member 70.

An attachment structure of the mount member 70 to the vehicle floor 2 will be described referring to FIGS. 10 and 11.

Referring to FIG. 10, the mount member 70 is fixed to the vehicle floor 2 at plural (four, in the present embodiment) fixation positions P1, P2, P3, P4 at both sides, in the X direction, thereof. Plural bolts are used for attachment of the mount member 70 to the vehicle floor 2. Further, the mount member 70 is attached to the vehicle floor directly or via the tunnel side reinforcements 81.

Referring to FIG. 11, at the first lateral plate portion 51a of the upper step portion 51 of the vehicle floor 2 are formed through holes which respectively correspond to the outside fixation portion 73a and the inside fixation point 73b of the first protrusion portion 73 of the mount member 70. Further, a through hole which corresponds to the fixation portion 74a of the second protrusion portion 74 of the mount member 70 and a through hole which corresponds to the fixation portion 75a of the third protrusion portion 75 of the mount member 70 are formed at the first lateral plate portion 51a of the upper step portion 51 of the vehicle floor 2.

The tunnel side reinforcement 81 is attached to the first lateral plate portion 51a of the upper step portion 51 as described above. The tunnel side reinforcement 81, which extends in the Y direction, comprises a first attachment portion 81a which corresponds to the first protrusion portion 73 of the mount member 70, a second attachment portion 81b which corresponds to the second protrusion portion 74 of the mount member 70, and a third attachment portion 81c which corresponds to the third protrusion portion 75.

The first attachment portion 81a of the tunnel side reinforcement 81 is a flat-plate shaped part which extends along the first lateral plate portion 51a of the upper step portion 51, and a through hole (not illustrated) is formed at a position which corresponds to the inside fixation point 73b of the first protrusion portion 73.

The second attachment portion 81b of the tunnel side reinforcement 81 is configured to protrude downwardly, in the Z direction, so as to form a closed cross section together with the first lateral plate portion 51a of the upper step portion 51. A through hole (not illustrated) is formed at the second attachment portion 81b of the tunnel side reinforcement 81 at a position corresponding to the fixation point 74a of the second protrusion portion 74.

The third attachment portion 81c of the tunnel side reinforcement 81 is configured to protrude downwardly, in the Z direction, so as to form a closed cross section together with the first lateral plate portion 51a of the upper step portion 51. A through hole (not illustrated) is formed at the third attachment portion 81c of the tunnel side reinforcement 81 at a position corresponding to the fixation point 75a of the third protrusion portion 75.

Referring to FIG. 9, the mount member 70 is fixed to the first lateral plate portion 51a of the upper step portion 51 at the outside fixation point 73a of the first protrusion portion 73 (the fixation position P1 of FIG. 10) and also fixed to the first attachment portion 81a of the tunnel side reinforcement 81 at the inside fixation point 73b (shown in FIG. 8) of the first protrusion portion 73 (the fixation position P4 of FIG. 10). Further, the mount member 70 is fixed to the second lateral plate portion 81b of the tunnel side reinforcement 81 at the fixation point 74a of the second protrusion portion 74 (the fixation position P2 of FIG. 10) and also fixed to the third attachment portion 81c of the tunnel side reinforcement 81 at the fixation point 75a of the third protrusion portion 75 (the fixation position P3 of FIG. 10). As apparent from FIG. 9, the second attachment portion 81b and the third attachment portion 81c of the tunnel side reinforcement 81 are positioned on the downward side, in the Z direction, of the first lateral plate portion 51a of the upper step portion 51.

In other words, the fixation positions P1, P2, P3, P4 of the mount member 70 to the vehicle floor 2 are set at different positions, in the Z direction, from each other.

Further, in the three fixation positions P1, P2, P3 which are arranged in the Y direction, the fixation position P1 which is located at a center, in the Y direction, of three positions is provided at the first lateral plate portion 51a of the upper step portion 51, and the other two fixation positions P2, P3 are provided at the tunnel side reinforcement 81. That is, the central fixation position P1, in the Y direction, is provided to overlap the upper face portion 14a of the first floor cross member 14 in the Z direction (see FIG. 4).

Further, referring to FIG. 4, the fixation part 72 of the mount member 70 is positioned in a range of a height, in the Z direction, of the first floor cross member 14. That is, the four fixation positions P1, P2, P3, P4 of the mount member 70 to vehicle floor 2 are positioned in the range of the height, in the Z direction, of the first floor cross member 14.

[Tunnel Member]

Referring to FIGS. 6 and 10, the tunnel member 80 is a hollow extruded one which is configured to extend in the X direction and have a closed cross section in the cross section perpendicular to the X direction. The tunnel member 80 is made of aluminum alloy, for example. The tunnel member 80 is fixed to the first lateral plate portions 51a of the upper step portions 51 at both end portion, in the X direction, thereof. As shown in FIG. 6, the tunnel member 80 is located in a rage of a height, in the Z direction, of the second floor cross member 16. Specifically, the tunnel member 80 is positioned in the Z direction so that it overlaps the upper face portion 16a of the second floor cross member 16.

[Surrounding Structure of Inside Seat Rail]

Figure 12:
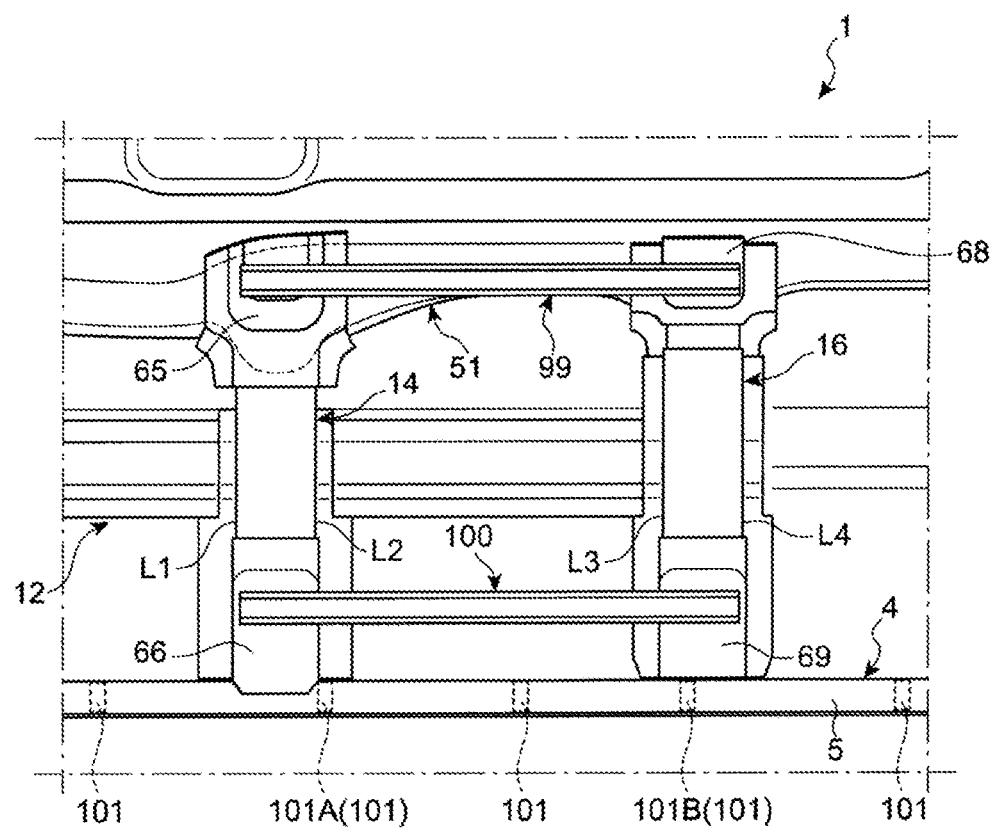
FIG. 12 is a plan view showing a surrounding area of a seat rail according to the embodiment.
Figure 12:
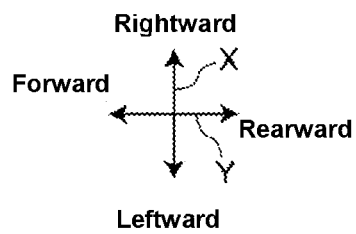

FIG. 12 is a plan view showing a surrounding area of the inside seat rail 99 and the outside seat rail 100. Referring to FIGS. 1, 4, 6 and 12, a structure of the side sill 4 around the inside seat rail 99 will be described.

Referring to FIG. 1, the side sill 4 of the present embodiment has plural (five in the present embodiment) gussets 101 which are provided inside the side sill inner 5.

The gusset 101 is a flat-plate shaped member which extends along a plane crossing the Y direction, and fixed to the side sill inner 5 by welding, for example. As apparently shown in FIG. 12, a gusset 101A is located at a position which overlaps the first floor cross member 14 in the Y direction. Specifically, the gusset 101A is provided on the side of the second floor cross member 16 of a center of the first floor cross member 14 in the Y direction at a position which overlaps the first rear-side ridgeline L2. Further, a gusset 101B is located at a position which overlaps the second floor cross member 16 in the Y direction. Specifically, the gusset 101B is provided on the side of the first floor cross member 14 of a center of the second floor cross member 16 in the Y direction at a position which overlaps the second front-side ridgeline L3.

Referring to FIG. 4, the gusset 101 is provided such that it overlaps the first floor cross member 14 ad the floor frame 12 in the Z direction. Referring to FIG. 6, the gusset 101 is provided such that it overlaps the second floor cross member 16 ad the floor frame 12 in the Z direction.

Referring to FIG. 12, as described above, the ladder-shaped structure is formed by means of the first floor cross members 14 and the second floor cross member 16 which respectively extend in the X direction and the upper step portions 51, the floor frames 12, and the side sills 4 which respectively extend in the Y direction. The first inside seat bracket 65, the outside seat bracket 66, the second inside seat bracket 68, and the second outside seat bracket 69 are fixed to the above-described ladder-shaped structure. That is, the inside seat rail 99 and the outside seat rail 100 are fixed to the ladder-shaped structure.

According to this structure, the frame structure is formed at the vehicle floor 2 by means of the side sill 4 and the floor frame 12 which respectively extend in the Y direction and having the closed cross section and the first floor cross member 14 and the second floor cross member 16 which respectively extend in the X direction and having the closed cross section. Further, the members of this frame structure are configured not to be offset in the Z direction. Accordingly, the support rigidity of the vehicle floor 2 for attaching the seat can be properly improved, and also a sense of unity between the vehicle body and the seat can be improved by fixing the first inside seat bracket 65, the second inside seat bracket 68, and the second outside seat bracket 69 for attaching the seat to the frame structure.

Further, since the gusset 101 extending along the plane crossing the Y direction is provided at the side sill 4, the strength, in the Z direction and in the X direction, of the side sill 4 can be improved. Moreover, the gusset 101A is located at the position overlapping the first floor cross member 14 in the Y direction and the gusset 101B is located at the position overlapping the second floor cross member 16 in the Y direction. Accordingly, the rigidity of the frame structure formed by means of the side sill 4, the floor frame 12, the first floor cross member 14, and the second floor cross member 16 can be improved.

The gusset 101A is located at the position which overlaps the first floor cross member 14 in the Y direction, and also located at the position which is offset, toward the second floor cross member 16, from a center, in the Y direction, of the first floor cross member 14. A load applied from the seat can be effectively transmitted to the first floor cross member 14 by way of the gusset 101A because the seat is generally arranged between the first floor cross member 14 and the second floor cross member 16 in the Y direction.

The gusset 101B is located at the position which overlaps the second floor cross member 16 in the Y direction, and also located at the position which is offset, toward the first floor cross member 14, from a center, in the Y direction, of the second floor cross member 16. The load applied from the seat can be effectively transmitted to the second floor cross member 16 by way of the gusset 101A because the seat is generally arranged between the first floor cross member 14 and the second floor cross member 16 in the Y direction.

The frame structure is formed at the vehicle floor 2 by means of the side sill 4, the floor frame 12, the first floor cross member 14, and the second floor cross member 16. The first outside seat bracket 66 is fixed to the side sill 4 and the first floor cross member 14, and fixed to a corner portion which is formed by the side sill 4 and the first floor cross member 14. Accordingly, the support rigidity of the vehicle floor 2 for attaching the seat can be properly improved.

Likewise, the second outside seat bracket 69 is fixed to the side sill 4 and the second floor cross member 16, and fixed to a corner portion which is formed by the side sill 4 and the second floor cross member 16. Accordingly, the support rigidity of the vehicle floor 2 for attaching the seat can be properly improved.

Fuehrer, the ladder-shaped structure is formed at the vehicle floor 2 by means of the side sill 4, the upper step portion 51, and the floor frame 12 which respectively extend in the Y direction and the first floor cross member 14 and the second floor cross member 16 which respectively extend in the X direction. The first inside seat bracket 65 is fixed to the upper step portion 51 and the first floor cross member 14, and therefore this bracket 65 is fixed to a corner portion which is formed by the upper step portion 51 and the first floor cross member 14. Accordingly, the support rigidity of the vehicle floor 2 for attaching the seat can be properly improved.

Likewise, the second inside seat bracket 68 is fixed to the upper step portion 51 and the second floor cross member 16, and therefore this bracket 68 is fixed to the corner portion which is formed by the upper step portion 51 and the second floor cross member 16. Accordingly, the support rigidity of the vehicle floor 2 for attaching the seat can be properly improved.

Moreover, since the upper step portion 51 configured to rise upwardly is provided between the top face portion 3 of the vehicle floor 2 and the floor tunnel 50, the rigidity of the boundary area between the top face portion 3 of the vehicle floor 2 and the floor tunnel 50 can be improved. Since the first inside seat bracket 65 and the second inside seat bracket 68 are fixed to the upper step portion 51, the support rigidity of the vehicle floor 2 for attaching the seat can be properly improved.

(Modified Example)

Figure 13:
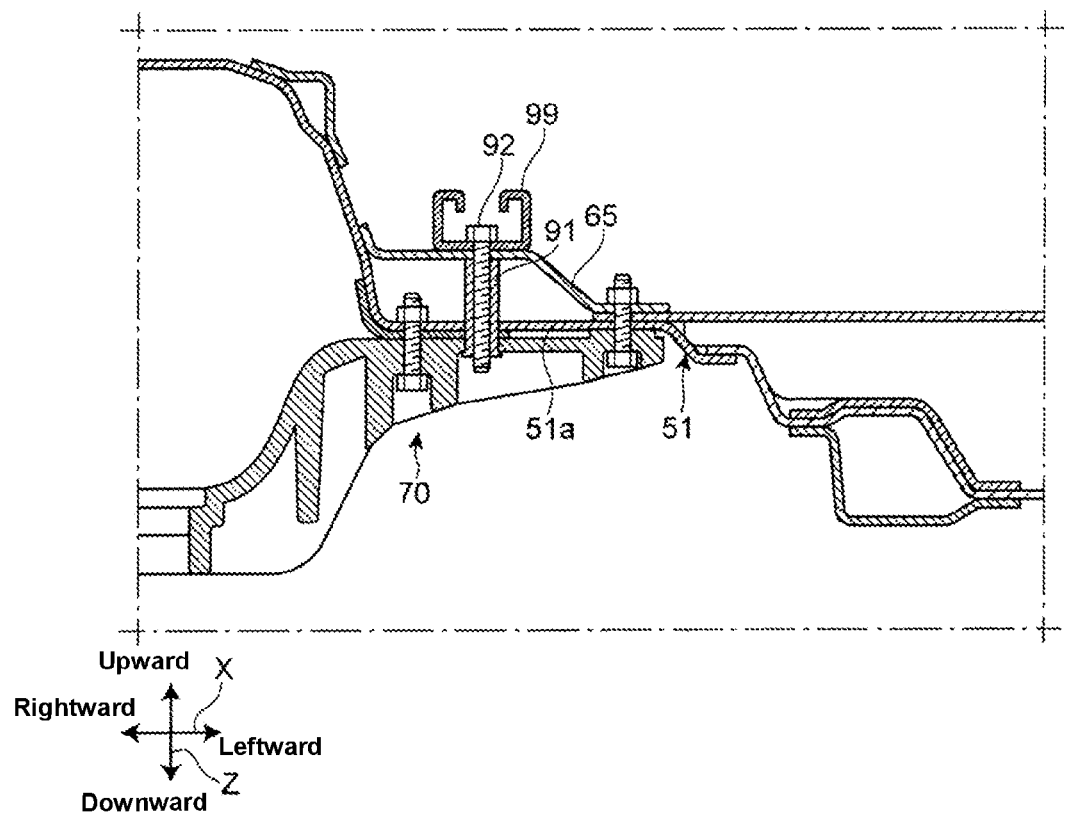
FIG. 13 is a partial enlarged sectional view of a modified example of the embodiment, which is similar to FIG. 5.
Figure 14:
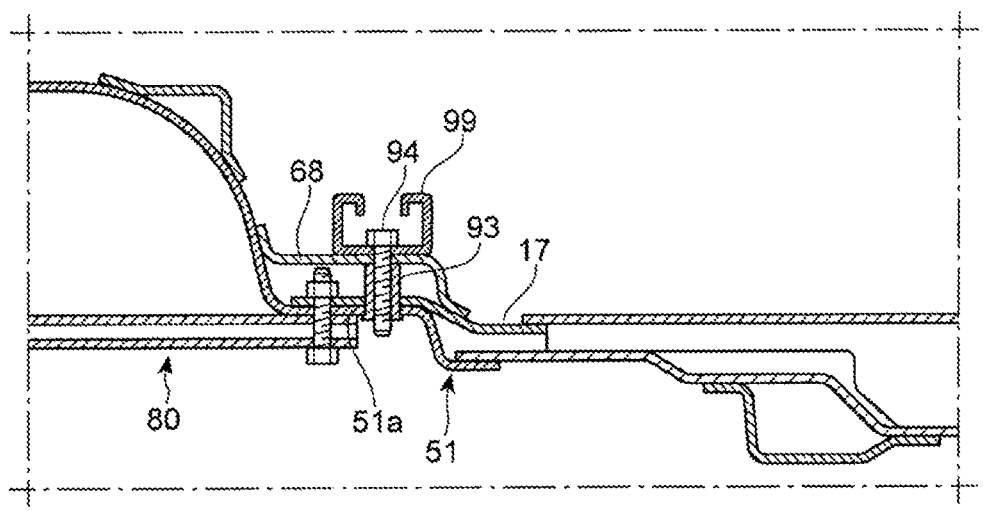
FIG. 14 is a partial enlarged sectional view of the modified example of the embodiment, which is similar to FIG. 7.
Figure 14:
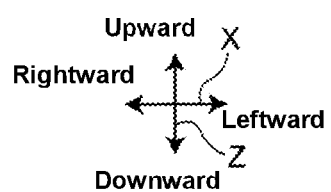

Referring to FIGS. 13 and 14, a modified example of the fixation structure of the inside seat rail 99 will be described.

Referring to FIG. 13, the inside seat rail 99 of the modified example is fastened together with the first inside seat bracket 65, the upper step portion 51, and the mount member 70. Specifically, a tall nut (spacer) 91 is provided to penetrate the mount member 70 and the first lateral plate portion 51*a* of the upper step portion 51, and a bolt 92 which is provided to penetrate the first inside seat bracket 65 and the inside seat rail 99 is screwed to the tall nut 91.

Further, referring to FIG. 14, the inside seat rail 99 of the modified example is fastened together with the second inside seat bracket 68, the upper step portion 51, and the connecting member 17. Specifically, a tall nut (spacer) 93 is provided to penetrate the connecting member 17 and the first lateral plate portion 51*a* of the upper step portion 51, and a bolt 94 which is provided to penetrate the second inside seat bracket 68 and the inside seat rail 99 is screwed to the tall nut 93.

According to this modified example, since the second inside seat bracket 68 and the first lateral plate portion 51*a* of the upper step portion 51 are interconnected by the tall nut 91, the strength of the first inside seat bracket 65 against compression which is generated in the Z direction by the load applied from the inside seat rail 99 can be improved. Likewise, since the second inside seat bracket 68 and the first lateral plate portion 51*a* of the upper step portion 51 are interconnected by the tall nut 93, the strength of the second inside seat bracket 68 against compression which is generated in the Z direction by the load applied from the inside seat rail 99 can be improved.

The present invention should not be limited to the above-described embodiment and modified example and any other modifications or improvements may be applied within the scope of a spirit of the present invention.

For example, while the tall nut 91 is used as the spacer which is provided between the vehicle floor 2 and the first inside seat bracket 65 according to the above-described modified example, a collar having no screw hole may be applied instead of the spacer in the present invention.

What is claimed is:

1. A lower vehicle-body structure, comprising:
a vehicle floor comprising a top face portion;
a first floor cross member extending in a vehicle width direction and provided on the top face portion of the vehicle floor, the first floor cross member forming a closed cross section between the top face portion of the vehicle floor and the first floor cross member in a cross section perpendicular to the vehicle width direction;
a second floor cross member extending in the vehicle width direction and provided on the top face portion of the vehicle floor, the second floor cross member forming a closed cross section between the top face portion of the vehicle floor and the second floor cross member in a cross section perpendicular to the vehicle width direction, the second floor cross member being spaced, in a vehicle longitudinal direction, apart from the first floor cross member;
a side sill extending in the vehicle longitudinal direction and provided at an end portion, in the vehicle width direction, of the top face portion of the vehicle floor, the side sill forming a closed cross section between the top face portion of the vehicle floor and the side sill in a cross section perpendicular to the vehicle longitudinal direction;
a floor frame extending in the vehicle longitudinal direction and provided on a bottom face portion of the vehicle floor at a position which is located on an inward side, in the vehicle width direction, of the side sill, the floor frame forming a closed cross section between the bottom face portion of the vehicle floor and the floor frame in a cross section perpendicular to the vehicle longitudinal direction; and
an attaching member attaching a seat to a vehicle body,
wherein said first floor cross member, said second floor cross member, said side sill, and said floor frame are located at respective positions which overlap each other at least partially in a vehicle vertical direction, and said attaching member is fixed to the side sill, the first floor cross member, and/or the second floor cross member,
wherein said vehicle floor comprises a floor tunnel which is configured to protrude substantially upwardly from said top face portion and extend substantially in the vehicle longitudinal direction, and
wherein the floor frame comprises an upper frame member and a lower frame member that face each other.

2. The lower vehicle-body structure of claim 1, wherein said side sill includes a reinforcing plate which extends along a plane crossing the vehicle longitudinal direction inside the closed cross section of the side sill, and the reinforcing plate is located at a position which overlaps at least one of said first floor cross member and said second floor cross member in the vehicle longitudinal direction.

3. The lower vehicle-body structure of claim 2, wherein said reinforcing plate is located at a position which overlap said first floor cross member in the vehicle longitudinal direction, and the reinforcing member is located at a position which is offset, toward said second floor cross member, from a center, in the vehicle longitudinal direction, of the first floor cross member.

4. The lower vehicle-body structure of claim 2, wherein said reinforcing plate is located at a position which overlap said second floor cross member in the vehicle longitudinal direction, and the reinforcing member is located at a position which is offset, toward said first floor cross member, from a center, in the vehicle longitudinal direction, of the second floor cross member.

5. The lower vehicle-body structure of claim 3, wherein said reinforcing plate is located at a position which overlap said second floor cross member in the vehicle longitudinal direction, and the reinforcing member is located at a position which is offset, toward said first floor cross member, from a center, in the vehicle longitudinal direction, of the second floor cross member.

6. The lower vehicle-body structure of claim 1, wherein said attaching member is fixed to said side sill and any one of said first floor cross member and said second floor cross member.

7. The lower vehicle-body structure of claim 2, wherein said attaching member is fixed to said side sill and any one of said first floor cross member and said second floor cross member.

8. The lower vehicle-body structure of claim 3, wherein said attaching member is fixed to said side sill and any one of said first floor cross member and said second floor cross member.

9. The lower vehicle-body structure of claim 4, wherein said attaching member is fixed to said side sill and any one of said first floor cross member and said second floor cross member.

10. The lower vehicle-body structure of claim 5, wherein said attaching member is fixed to said side sill and any one of said first floor cross member and said second floor cross member.

11. The lower vehicle-body structure of claim 1, wherein said vehicle floor comprises an upper step portion which is configured to rise upwardly toward said floor tunnel from the top face portion in the vehicle width direction, and said attaching member is attached to said upper step portion and any one of said first floor cross member and said second floor cross member.

12. The lower vehicle-body structure of claim 2, wherein said vehicle floor comprises an upper step portion which is configured to rise upwardly toward said floor tunnel from the top face portion in the vehicle width direction, and said attaching member is attached to said upper step portion and any one of said first floor cross member and said second floor cross member.

13. The lower vehicle-body structure of claim 3, wherein said vehicle floor comprises an upper step portion which is configured to rise upwardly toward said floor tunnel from the top face portion in the vehicle width direction, and said attaching member is attached to said upper step portion and any one of said first floor cross member and said second floor cross member.

14. The lower vehicle-body structure of claim 4, wherein said vehicle floor comprises an upper step portion which is configured to rise upwardly toward said floor tunnel from the top face portion in the vehicle width direction, and said attaching member is attached to said upper step portion and any one of said first floor cross member and said second floor cross member.

15. The lower vehicle-body structure of claim 5, wherein said vehicle floor comprises an upper step portion which is configured to rise upwardly toward said floor tunnel from the top face portion in the vehicle width direction, and said attaching member is attached to said upper step portion and any one of said first floor cross member and said second floor cross member.

16. The lower vehicle-body structure of claim 11, further comprising a spacer which is interposed between said attaching member and said upper step portion and interconnects the attaching member and the upper step portion.

17. The lower vehicle-body structure of claim 12, further comprising a spacer which is interposed between said attaching member and said upper step portion and interconnects the attaching member and the upper step portion.

18. The lower vehicle-body structure of claim 1, wherein the attaching member comprises a seat bracket which connects the first floor cross member to the floor tunnel and connects a seat rail to the first floor cross member.

19. A lower vehicle-body structure, comprising:
a vehicle floor comprising a top face portion;
a first floor cross member extending in a vehicle width direction and provided on the top face portion of the vehicle floor, the first floor cross member forming a closed cross section between the top face portion of the vehicle floor and the first floor cross member in a cross section perpendicular to the vehicle width direction;
a second floor cross member extending in the vehicle width direction and provided on the top face portion of the vehicle floor, the second floor cross member forming a closed cross section between the top face portion of the vehicle floor and the second floor cross member in a cross section perpendicular to the vehicle width direction, the second floor cross member being spaced, in a vehicle longitudinal direction, apart from the first floor cross member;
a side sill extending in the vehicle longitudinal direction and provided at an end portion, in the vehicle width direction, of the top face portion of the vehicle floor, the side sill forming a closed cross section between the top face portion of the vehicle floor and the side sill in a cross section perpendicular to the vehicle longitudinal direction;
a floor frame extending in the vehicle longitudinal direction and provided on a bottom face portion of the vehicle floor at a position which is located on an inward side, in the vehicle width direction, of the side sill, the floor frame forming a closed cross section between the bottom face portion of the vehicle floor and the floor frame in a cross section perpendicular to the vehicle longitudinal direction;
an attaching member attaching a seat to a vehicle body;
a mount member which is joined to the bottom face portion of the vehicle floor, extends in the vehicle width direction and is located at a position which corresponds to the first floor cross member; and
a tunnel member which is joined to the bottom face portion of the vehicle floor, extends in the vehicle width direction and is located at a position which corresponds to the second floor cross member, and
wherein said first floor cross member, said second floor cross member, said side sill, and said floor frame are located at respective positions which overlap each other at least partially in a vehicle vertical direction, and said attaching member is fixed to the side sill, the first floor cross member, and/or the second floor cross member.

20. The lower vehicle-body structure of claim 19, wherein the attaching member comprises a seat bracket which connects the first floor cross member to the floor tunnel and connects a seat rail to the first floor cross member.

* * * * *